US008749686B2

(12) United States Patent
Nelson

(10) Patent No.: US 8,749,686 B2
(45) Date of Patent: Jun. 10, 2014

(54) CCD IMAGE SENSORS AND METHODS

(75) Inventor: Edward T. Nelson, Rochester, NY (US)

(73) Assignee: Truesense Imaging, Inc., Rochester, NY (US)

( * ) Notice: Subject to any disclaimer, the term of this patent is extended or adjusted under 35 U.S.C. 154(b) by 31 days.

(21) Appl. No.: 13/457,827

(22) Filed: Apr. 27, 2012

(65) Prior Publication Data

US 2012/0274824 A1 Nov. 1, 2012

Related U.S. Application Data

(60) Provisional application No. 61/480,390, filed on Apr. 29, 2011.

(51) Int. Cl.
*H04N 3/14* (2006.01)
*H04N 5/232* (2006.01)
*H01L 29/66* (2006.01)

(52) U.S. Cl.
USPC ........... 348/311; 348/297; 348/294; 348/302; 348/211.5; 257/242; 257/239; 257/183.1; 257/266; 250/208.1

(58) Field of Classification Search
CPC .......... H04N 3/14; H04N 5/232; H01L 29/66; H01L 27/00
USPC ........... 348/211.5, 343, 423.1, 482, 300–311, 348/294–298; 257/183.1, 215, 226, 238, 257/184, 266, 242, 287, 297, 239; 250/208.1
See application file for complete search history.

(56) References Cited

U.S. PATENT DOCUMENTS

| 4,539,596 | A | | 9/1985 | Elabd |
| 5,043,819 | A | | 8/1991 | Cheon et al. |
| 5,060,245 | A | * | 10/1991 | Nelson ............................ 377/60 |
| 5,400,071 | A | | 3/1995 | Yamada |
| 5,440,343 | A | | 8/1995 | Parulski et al. |
| 5,650,352 | A | | 7/1997 | Kamasz et al. |
| 5,904,495 | A | | 5/1999 | Burke et al. |
| 6,043,839 | A | | 3/2000 | Adair et al. |
| 6,724,062 | B2 | | 4/2004 | Akahori et al. |
| 6,809,769 | B1 | | 10/2004 | Yang |
| 6,876,019 | B2 | | 4/2005 | Shinohara |
| 7,199,410 | B2 | | 4/2007 | Dierickx |
| 7,385,638 | B2 | | 6/2008 | Parks |
| 7,508,436 | B2 | | 3/2009 | Parks |
| 7,728,279 | B2 | | 6/2010 | Mauritzson |

(Continued)

FOREIGN PATENT DOCUMENTS

| EP | 0249113 | 12/1987 |
| EP | 2154879 | 2/2010 |
| WO | WO-95/20825 | 8/1995 |
| WO | WO-2007/078760 | 7/2007 |

OTHER PUBLICATIONS

European Search Report mailed Sep. 17, 2012 for European Application No. EP 12 25 0103 (7 pages).

*Primary Examiner* — Tuan Ho
*Assistant Examiner* — Marly Camargo
(74) *Attorney, Agent, or Firm* — Howard & Howard Attorneys PLLC

(57) ABSTRACT

In various embodiments, image sensors include photosensitive pixels, associated vertical CCDs, sense nodes each accepting charge from one or more of the vertical CCDs, and readout circuitry accepting signals from the sense nodes.

15 Claims, 8 Drawing Sheets

(56) References Cited

U.S. PATENT DOCUMENTS

| | | |
|---|---|---|
| 7,768,677 B2 | 8/2010 | Kawai |
| 7,796,174 B1 | 9/2010 | Harwit et al. |
| 7,893,981 B2 | 2/2011 | Meisenzahl et al. |
| 7,948,534 B2 | 5/2011 | Meisenzahl |
| 2005/0068441 A1 | 3/2005 | Parks |
| 2005/0224842 A1* | 10/2005 | Toyama .................. 257/225 |
| 2006/0092482 A1 | 5/2006 | Yano et al. |
| 2008/0239105 A1 | 10/2008 | Xu |
| 2009/0021630 A1* | 1/2009 | Hasegawa ................ 348/311 |
| 2011/0074996 A1 | 3/2011 | Wang et al. |
| 2011/0074999 A1 | 3/2011 | Border et al. |
| 2011/0267516 A1 | 11/2011 | Parks et al. |

* cited by examiner

CCD IMAGE SENSORS AND METHODS

RELATED APPLICATIONS

This application claims the benefit of and priority to U.S. Provisional Patent Application No. 61/480,390, filed Apr. 29, 2011, the entire disclosure of which is hereby incorporated herein by reference.

TECHNICAL FIELD

The present invention relates, in various embodiments, to the construction, fabrication, and use of charge-coupled-device (CCD) image sensors.

BACKGROUND

CCD image sensors typically include an array of photosensitive areas (or "pixels") that collect charge carriers in response to illumination. The collected charge is subsequently transferred from the array of pixels and converted to a voltage from which an image may be reconstructed by associated circuitry. FIG. 1 depicts a conventional CCD image sensor 100 that contains an array of pixels 110 (each of which may include or consist essentially of a photodiode) arranged in columns. A vertical CCD (VCCD) 120 is disposed next to each column of pixels 110, and the VCCDs 120 are connected to a horizontal HCCD (HCCD) 130. Following an exposure period, charge is transferred from the pixels 110 into the VCCDs 120, which subsequently shift the charge, row-by-row in parallel, into the HCCD. The HCCD then transfers the pixel charge serially to output circuitry that includes a floating diffusion sense node 140 and an output buffer amplifier 150. The charge from the HCCD is converted, pixel-by-pixel, into voltage at the sense node 140 and amplifier 150, and the signal is then transferred to additional circuitry (either on-chip or off-chip) for reconstruction into an image.

Systems such as digital cameras utilizing CCD image sensors typically need to operate at high frame rates for, e.g., machine vision applications and video display. For cameras using conventional CCD image sensors, these high frame rates can result in high power consumption to generate so many horizontal scanning CCD clocking voltages and currents. Much of the power is generally lost to heat, which degrades the operation of the camera through higher imager dark current. Other potential disadvantages include increased readout noise due to the high signal-sampling frequency utilized during the readout operation.

One technique that has been utilized to address the power-consumption and noise issues with CCD image sensors is the separation of the pixel array and the readout circuitry onto separate chips, which are then bonded together. For example, FIG. 2 depicts an image-sensor system 200 consisting of an imaging array chip 210 and a readout chip 220. As described above with respect to FIG. 1, fabricated on chip 210 are columns of pixels 230 (individual pixels are not depicted for convenience) each adjoined by a VCCD 240. A readout circuit 250 is fabricated on the discrete chip 220, and chips 210, 220 are electrically and physically connected in hybrid fashion via multiple ball bonds 260. However, hybrid systems such as system 200 are expensive and involve complicated fabrication steps, as typically the chips 210, 220 are each fabricated with different semiconductor fabrication processes. Moreover, these hybrid systems are often less reliable than single-chip solutions due to the chip-to-chip interconnections. Thus, there is a need for monolithic CCD image sensors having reduced power consumption, low noise, and high reliability.

SUMMARY

Embodiments of the present invention provide image sensors with reduced power consumption and noise, particularly at high signal readout frequencies. The image sensors combine the imaging performance advantages of CCD detection and charge transport with the low power and low noise of column-scanning readout techniques. Embodiments of the invention thus include monolithic (i.e., single-chip) CCD image sensors that utilize a sense node at the end of each VCCD (or set of multiplexed VCCDs) and that replace the conventional HCCD with different, typically passive, readout circuitry. The pixel array and VCCDs may be fabricated via the same process as the readout circuitry, simplifying manufacture and rendering the fabrication less expensive. Thus, in many embodiments it is difficult for the pitch of the readout circuits for each column to match the pitch of the columns of pixels and associated VCCDs, as each column readout circuit typically includes too many transistors to fit within the chip width of each column defined by each column of pixels and its associated VCCD. Therefore, embodiments of the invention feature serialized VCCDs that share and are multiplexed into a single shared column readout circuit, thereby trading off readout speed for decreased chip area and readout transistor count. Furthermore, the column pitch of the image sensor may be additionally decreased via the fabrication of readout circuits on multiple sides of the pixel array, where some VCCDs are read out on one side while other VCCDs are read out on another side. For example, in one specific embodiment, every other VCCD is read out at the top of the array while the other VCCDs are read out at the bottom of the array.

Embodiments of the invention advantageously utilize charge binning within the VCCDs, as described in U.S. patent application Ser. No. 12/570,048, filed on Sep. 30, 2009, U.S. Pat. No. 7,385,638, filed on Apr. 28, 2004, U.S. Pat. No. 7,893,981, filed on Feb. 28, 2007, and U.S. Pat. No. 7,948, 534, filed on Oct. 22, 2008, the entire disclosure of each of which is incorporated by reference herein.

Embodiments of the invention feature an electronic shutter and associated control circuitry, as described in U.S. patent application Ser. No. 12/770,811, filed on Apr. 30, 2010, the entire disclosure of which is incorporated by reference herein.

In an aspect, embodiments of the invention feature an image sensor including or consisting essentially of an array of photosensitive pixels arranged in columns, a plurality of vertical CCDs, a plurality of sense nodes, and readout circuitry. Each vertical CCD is associated with one of the columns of pixels, and each sense node is associated with and accepts charge from one or more vertical CCDs and converts the charge into a voltage. The readout circuitry accepts voltage from the plurality of sense nodes and, based thereon, outputs signals for reconstruction into an image sensed by the array of photosensitive pixels.

Embodiments of the invention may incorporate one or more of the following in any of a variety of different combinations. Each sense node may be associated with a single vertical CCD. The readout circuitry may include or consist essentially of a discrete column readout circuit associated with each sense node. Each column readout circuit may include circuitry for subtracting a reference value from the sense node from a signal value from the sense node. The array of photosensitive pixels, the plurality of vertical CCDs, the plurality of sense nodes, and the readout circuitry may be all portions of a single monolithic integrated circuit. The readout circuitry may include or consist essentially of a readout circuit shared by multiple vertical CCDs. Delay registers may be disposed between the multiple vertical CCDs and the sense nodes associated therewith.

The delay registers may serialize output from the multiple vertical CCDs into the readout circuit shared thereby. A multiplexer may rout signals between the sense nodes associated with the multiple vertical CCDs and the readout circuit.

The image sensor may include one or more delay stages for outputting charges from two or more vertical CCDs into a single sense node. The delay stage(s) may be configured to combine charges from the two or more vertical CCDs prior to output to the single sense node. The readout circuitry may include or consist essentially of (i) a first portion disposed on a first side of the array of photosensitive pixels and (ii) a second portion disposed on a second side of the array of photosensitive pixels different from (e.g., opposite) the first side. Some of the sense nodes may be disposed on the first side and some other sense nodes may be disposed on the second side. Each sense node may include or consist essentially of a floating diffusion, a reset transistor, and an amplifier. The image sensor may have an interline architecture in which each vertical CCD is proximate the column of pixels associated therewith. The image sensor may have a full-frame architecture in which each vertical CCD is the column of pixels associated therewith.

In another aspect, embodiments of the invention feature a method of operating an image sensor comprising an array of photosensitive pixels arranged in columns and a vertical CCD associated with each column of pixels. Charge is converted from one or more vertical CCDs into voltage, thereby forming a plurality of different sense voltages. The plurality of sense voltages are read out for reconstruction thereof into an image sensed by the array of photosensitive pixels.

Embodiments of the invention may incorporate one or more of the following in any of a variety of different combinations. The charge conversion may be performed at sense nodes, each of which is associated with one or more vertical CCDs. Charge from a plurality of vertical CCDs may be serially transferred into a single source node. Charge from a plurality of vertical CCDs may be combined prior to the charge conversion. Reading out the plurality of sense voltages may include multiplexing multiple sense voltages for transfer into a single readout circuit. The charge conversion and reading out may be performed for a first portion of the photosensitive pixels on a first side of the array and for a second portion of the photosensitive pixels on a second side of the array different from (e.g., opposite) the first side. The charge conversion and reading out of the sense voltages may be performed on a single monolithic integrated circuit that also contains the array of photosensitive pixels and the vertical CCDs.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
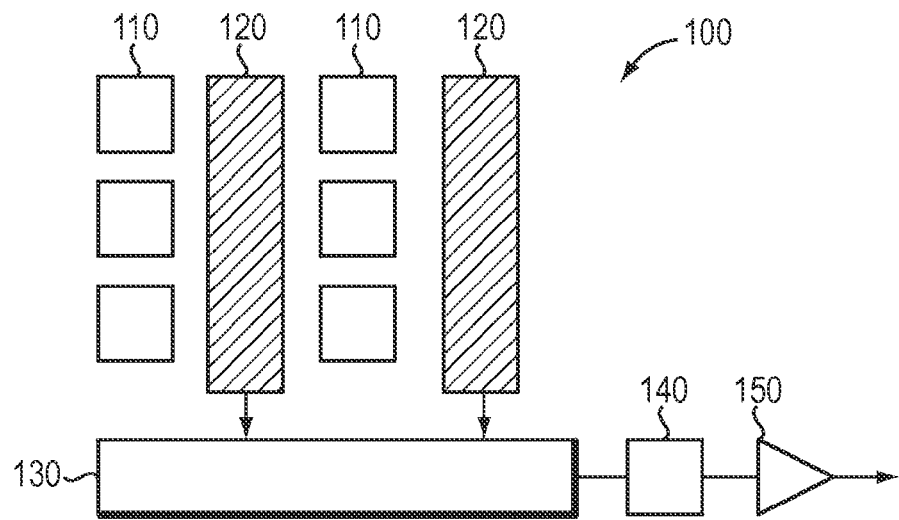
FIG. 1 is a block diagram of a conventional CCD image sensor.
Figure 2:
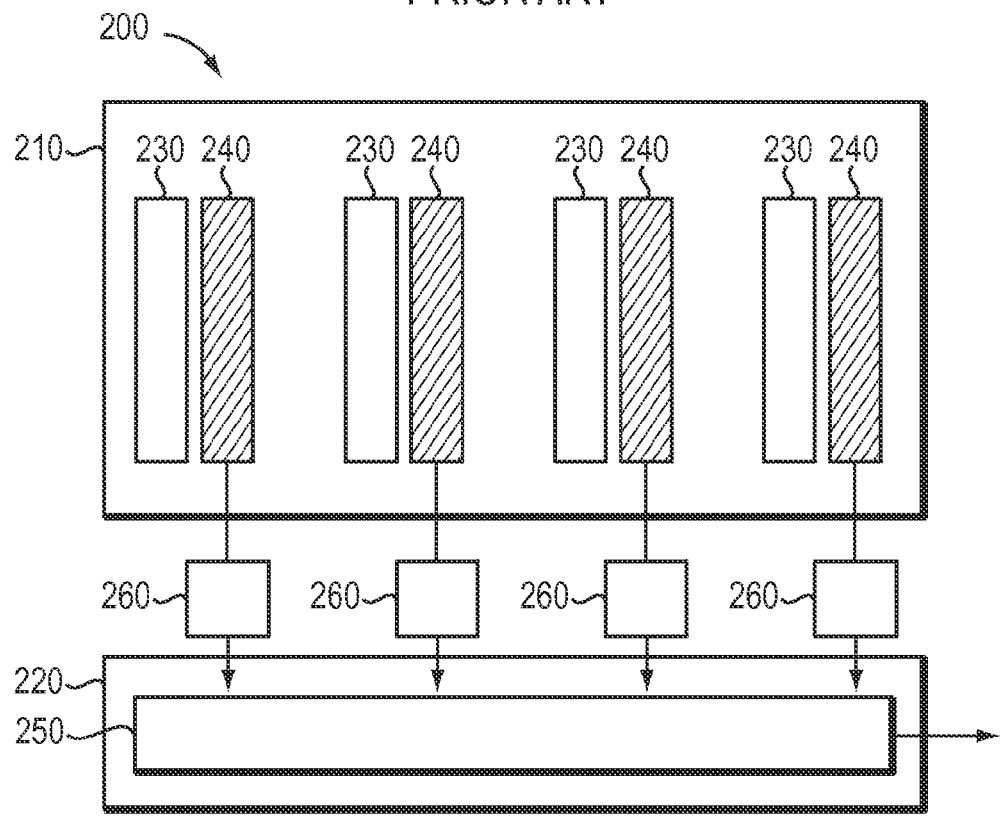
FIG. 2 is a block diagram of a hybrid CCD image-sensor system incorporating discrete image-sensor and readout chips bonded together.
Figure 3:
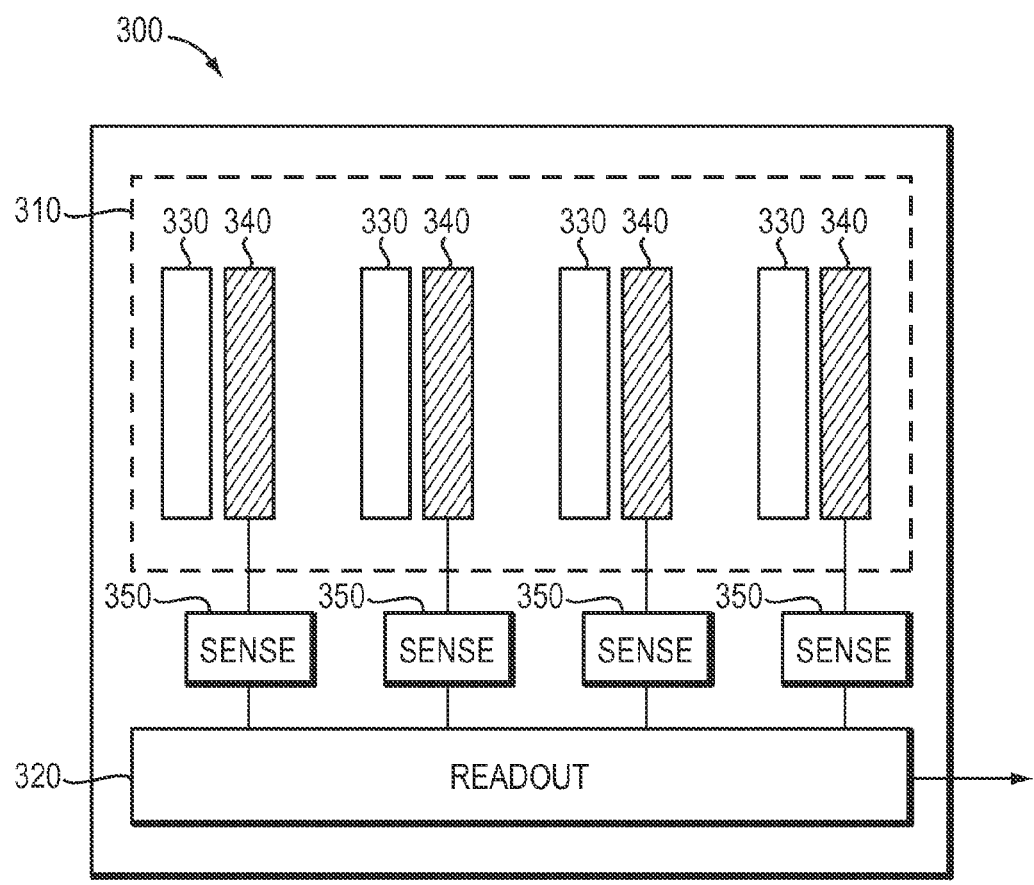
FIG. 3 is a block diagram of a monolithic CCD image sensor in accordance with various embodiments of the invention.

FIG. 3 depicts a monolithic CCD image sensor 300 in accordance with various embodiments of the present invention. Image sensor 300 features a CCD imaging array region 310 and readout circuitry 320 both fabricated as portions of the same integrated circuit chip (e.g., a chip fabricated on a semiconductor substrate such as one including or consisting essentially of silicon). Region 310 includes columns 330 of photosensitive pixels, each of which is associated with a VCCD 340. As depicted in FIG. 3, columns 330 and VCCDs 340 thus form an in-line (or "interline") photosensitive CCD array. Alternative embodiments of the present invention utilized photosensitive CCD columns that also function as the VCCDs (in effect combining columns 330 with VCCDs 340) in a "full-frame" architecture. Such embodiments may advantageously incorporate a mechanical shutter to prevent exposure of the array to light during the transfer of charge from the photosensitive columns to the sense nodes and readout circuitry.

Each VCCD 340 (or set of multiple VCCDs 340, as detailed further below) transfers charge from the pixels in columns 330 to a sense node 350, e.g., a floating diffusion node electrically isolated from other nodes in the device. At each sense node 350, the received charge is converted to a voltage that is passed to readout circuitry 320 for output and reconstruction into an image outside image sensor 300 (either on the same chip or on another chip electrically connected thereto). The readout circuitry 320 replaces the conventional HCCD, and may include or consist essentially of a passive circuit as detailed below. (Thus, readout circuitry 320 is not an HCCD.) The imaging array region 310, sense nodes 350, and readout circuitry 320 are typically fabricated as a single monolithic integrated circuit utilizing, for example, the same semiconductor-manufacturing process (and, in some embodiments, design rules). Power consumption is reduced via replacement of the power-hungry conventional HCCD, and noise reduction is enabled by the utilization of sense nodes between the VCCDs and the column readout circuitry.

Figure 4A:
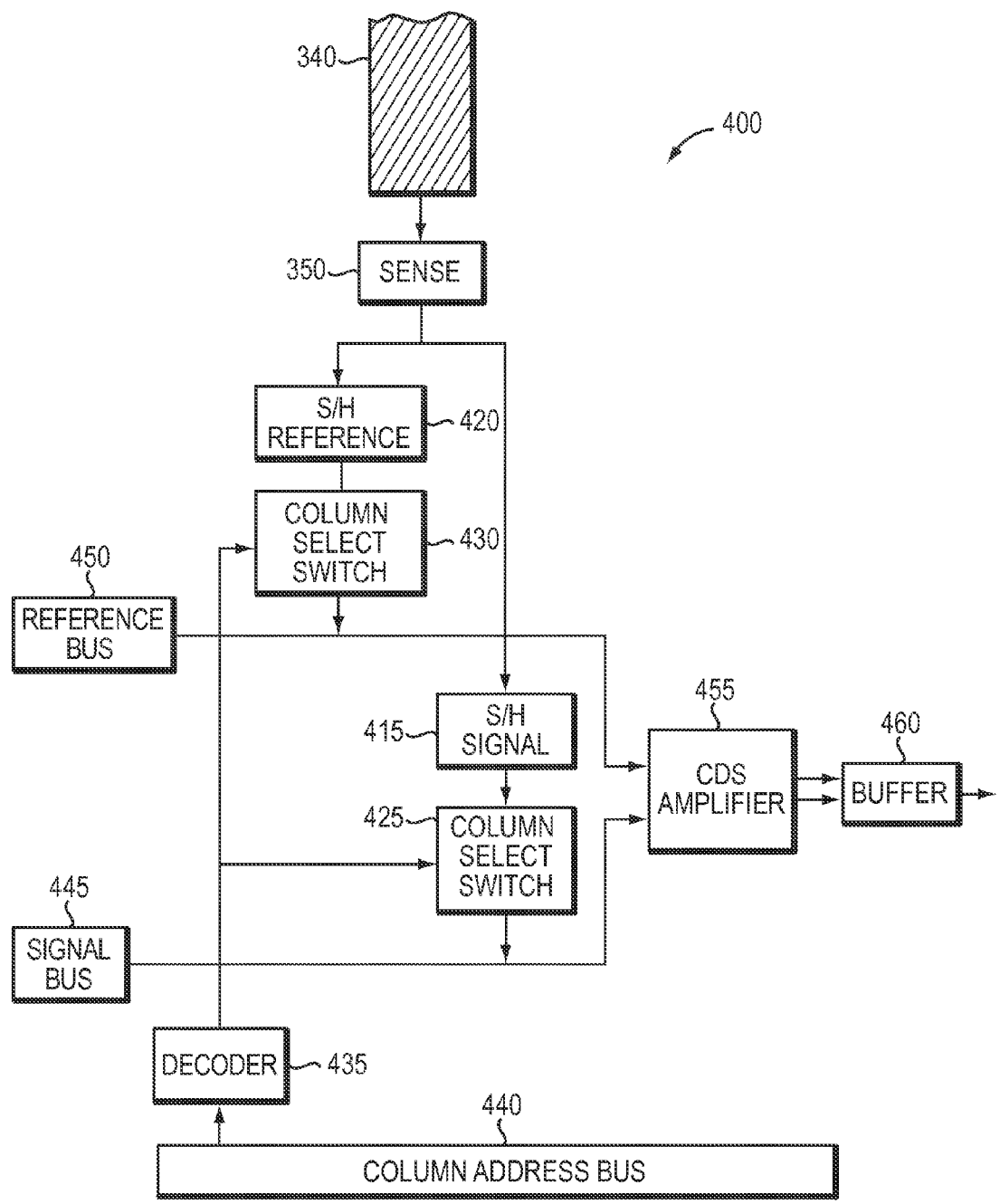
FIGS. 4A and 4B are, respectively, a block diagram and a circuit diagram of a column readout circuit utilized in various embodiments of the invention.
Figure 4B:
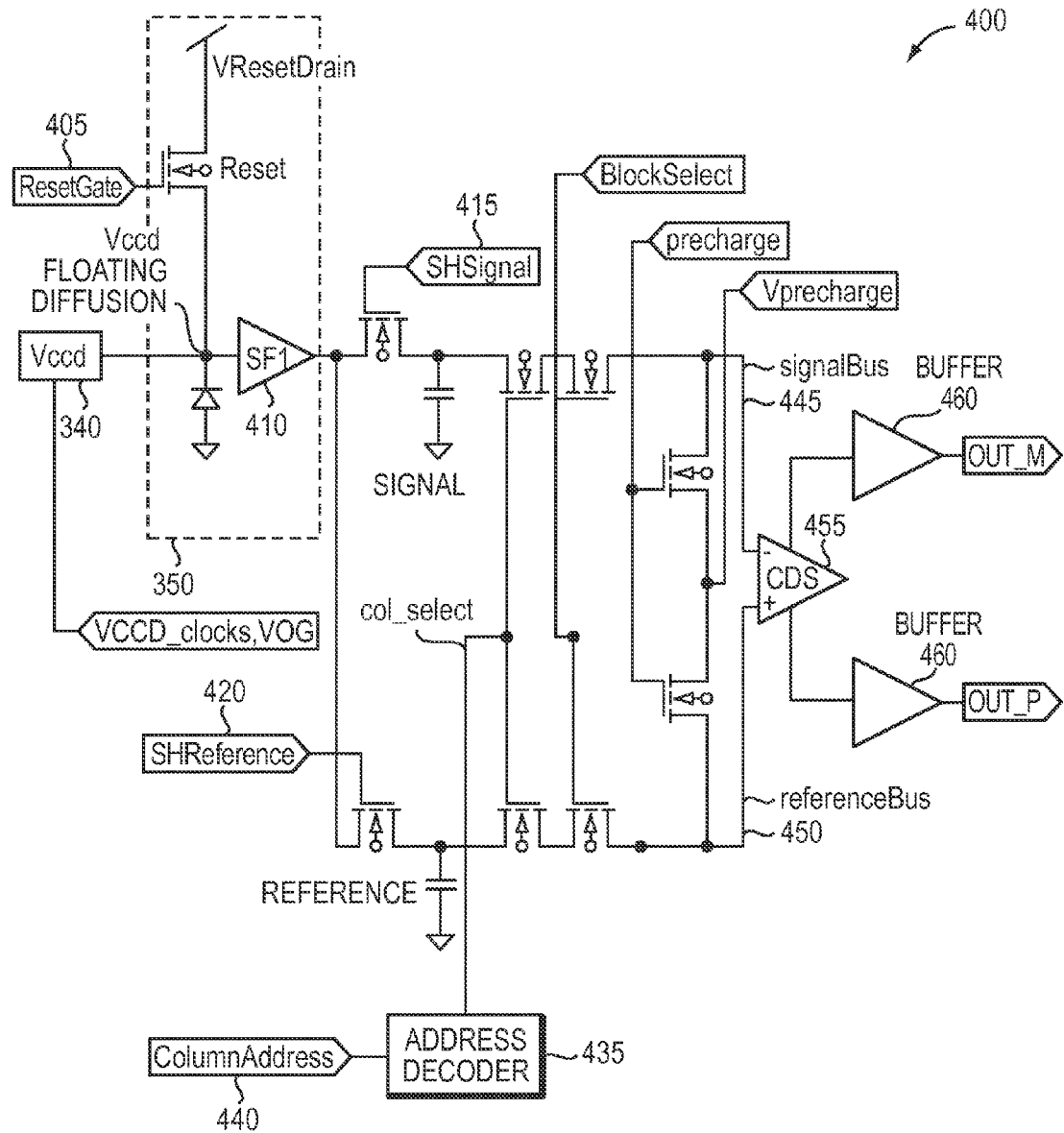

FIGS. 4A and 4B depict an exemplary passive column readout circuit 400 that may be utilized in various embodiments of the present invention. As shown, readout circuit 400 is connected to a single VCCD 340 via sense node 350, but as detailed below, multiple VCCDs 340 may be multiplexed together and thus share a single sense node 350 and readout circuit 400. As shown in FIG. 4B, the sense node 350 may be reset (i.e., emptied of charge) prior to receiving charge from the VCCD 340 via application of a signal to a reset gate 405. The charge from VCCD 340 is converted to a voltage at sense node 350, which is then passed (preferably, as shown in FIG. 4B, via an amplifier such as source follower amplifier 410) to a signal sample-and-hold (S/H) circuit 415. The voltage corresponding to the reset sense node 350 (i.e., prior to acceptance of charge from VCCD 340) is passed to a reference S/H circuit 420. The S/H circuits 415, 420 are connected via column select switches 425, 430 to a column address decoder 435 and a column address bus 440 that select the particular column (i.e., charge from VCCD 340) to be read out. The S/H circuits 415, 420 may each include, e.g., one or more capacitors and/or one or more transistors, as shown in FIG. 4B. The signals from the S/H circuits 415, 420 travel via a signal bus 445 and a reference bus 450 to a correlated double sampling (CDS) amplifier 455. The CDS amplifier 455 reduces or even substantially eliminates noise from the image signal by subtracting the reference signal (from reference S/H circuit 420) therefrom. The signal is then passed to one or more output buffers 460 and output for reconstruction into image data.

Figure 5:
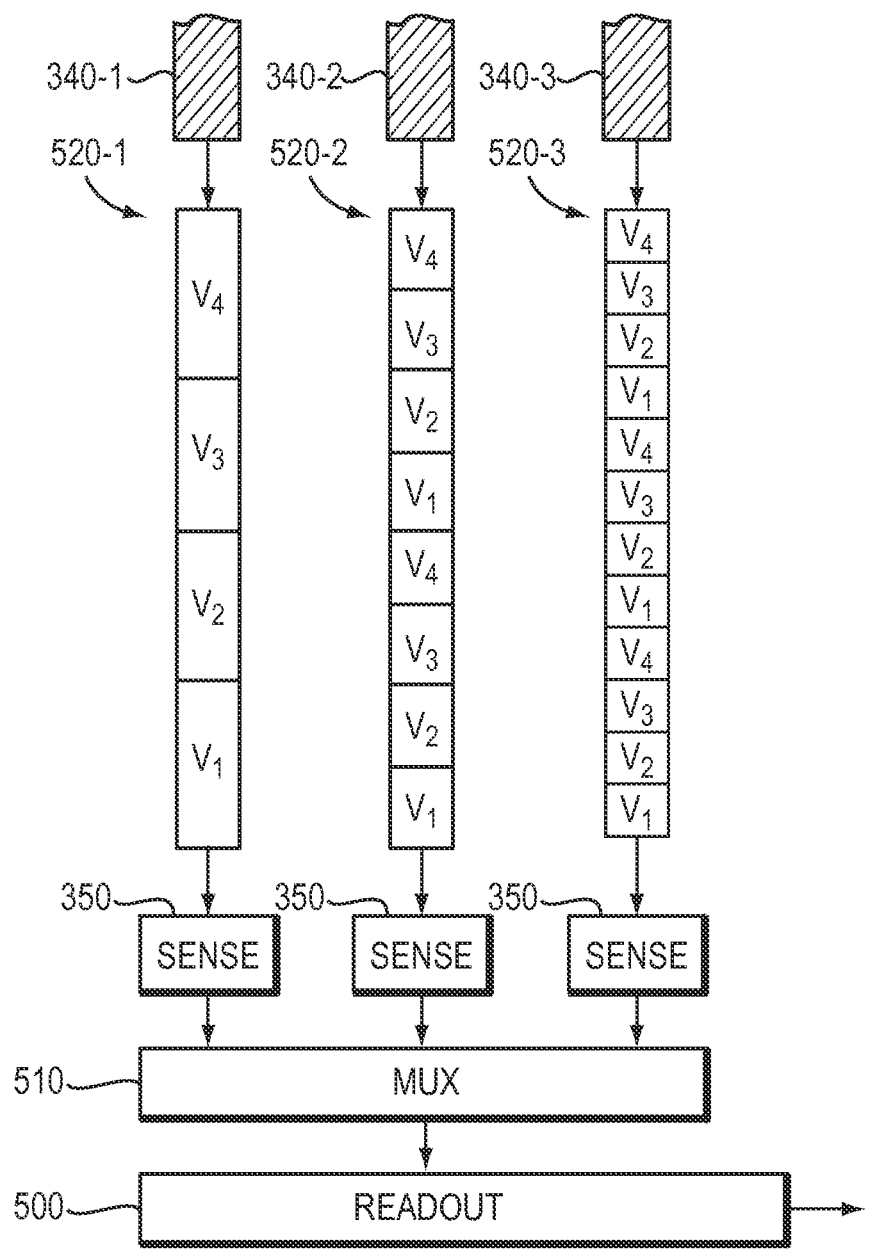
FIG. 5 is a block diagram of serialized VCCDs multiplexed into shared readout circuitry in accordance with various embodiments of the invention.

In some embodiments of the present invention, there may be insufficient chip area to fabricate particular column readout circuits (e.g., circuit 400) for each column of the CCD imaging array due to the number of devices within the individual readout circuits; that is, the individual column readout circuits may not fit within the column pitch of the pixel array, which is preferably minimized to provide higher imaging resolution. However, utilization of a certain number of devices within a column readout circuit may be advantageous, as in many embodiments (and as described above) the signal and reference voltage levels may both be sampled, enabling the minimization of various types of noise (e.g., fixed pattern noise due to the source follower offset voltage and/or temporal noise). FIG. 5 depicts an exemplary embodiment of the invention in which this chip-area limitation is addressed by multiplexing the outputs of multiple sense nodes 350 into a single column readout circuit 500, which may, e.g., include or consist essentially of circuit 400 (i.e., the S/H circuits 415, 420 and all components downstream therefrom). In the embodiment of FIG. 5, the outputs of three individual sense nodes 350 (each associated with a VCCD 340) are multiplexed into readout circuit 500 via a 3:1 switch 510. In other embodiments of the present invention, two, four, or even greater numbers of sense node outputs are multiplexed into a single readout circuit 500.

As also shown in FIG. 5, the outputs of the three VCCDs 340-1, 340-2, 340-3 into their respective sense nodes 350 and readout circuit 500 are serialized via the addition of delay registers 520-1, 520-2, 520-3 between the VCCDs and the sense nodes 350. As shown, each of the delay registers 520 contains different numbers of four stages (or "phases") $V_1$, $V_2$, $V_3$, $V_4$, where the same-numbered phases are clocked together, thereby passing charge packets to the next phase. (For example, each of the $V_1$ phases are connected to the same clocking circuit and are clocked together.) The different multiples of the phases within each delay register 520 thus combine to enable serialized output of the charge from the VCCDs 340-1, 340-2, 340-3 utilizing the clock(s) already utilized to shift charge through the VCCDs themselves. That is, after one clocking cycle of all four phases, the charge from VCCD 340-1 will reach its sense node 350 (where it is converted to a voltage), followed by charge from VCCD 340-2 after two clocking cycles and charge from VCCD 340-3 after three clocking cycles. The resulting voltages are then serially sent to readout circuit 500 via switch 510 for readout, e.g., as described above with respect to circuit 400. Thereafter, the next set of charges may be transferred from VCCDs 340-1, 340-2, 340-3 to the delay registers 520, and the above-described process may be repeated. In some embodiments of the invention, delay registers 520 have two, three, or more than four phases rather than the four depicted in FIG. 5. Since the phases of the delay registers 520 typically correspond to the phases within the VCCDs 340 themselves, the embodiment of FIG. 5 advantageously obviates the need for additional clocks (utilizing those already present for clocking the VCCDs 340).

Figure 6:
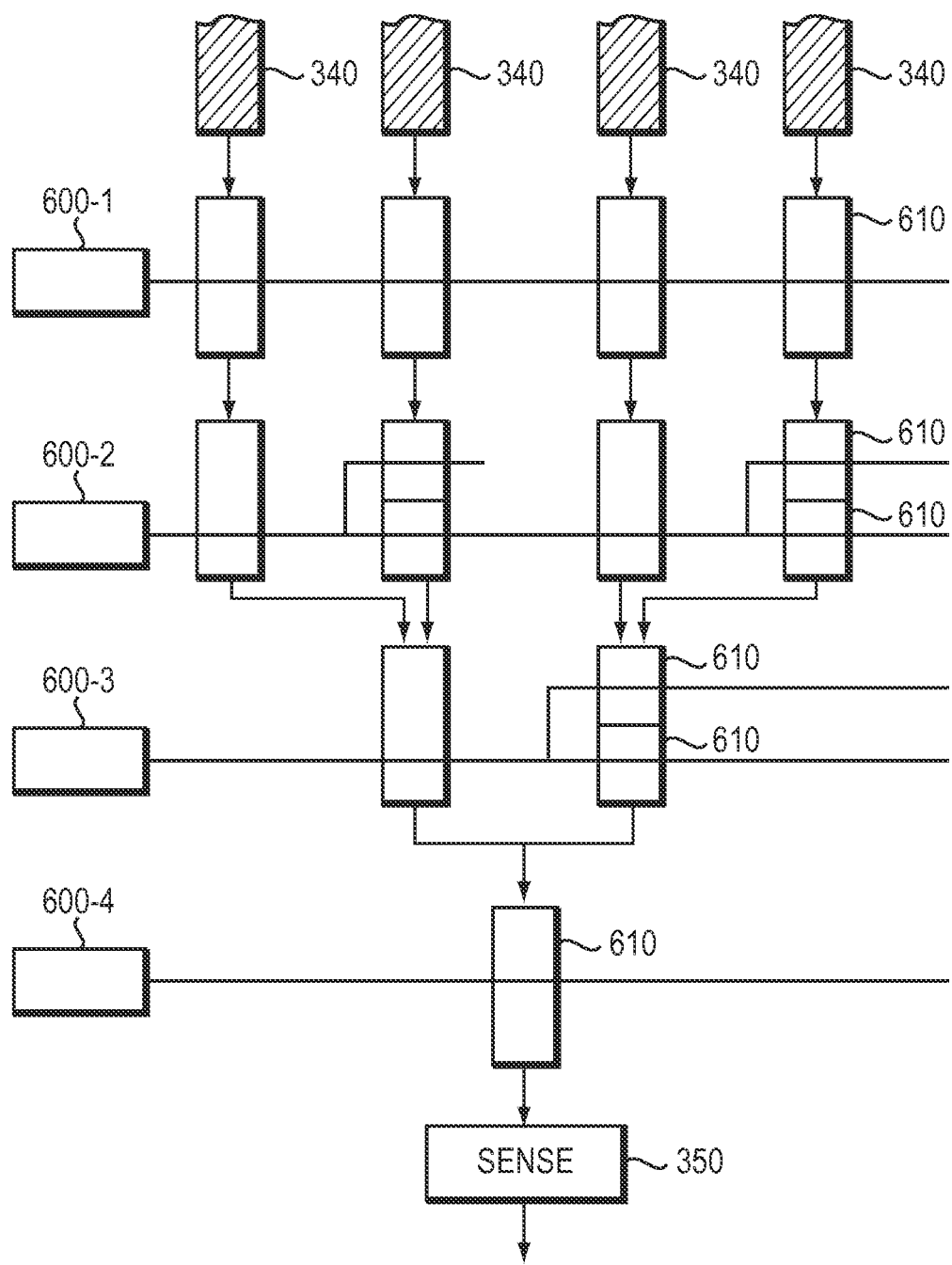
FIG. 6 is a block diagram of delay registers utilized to time-multiplex VCCD outputs in accordance with various embodiments of the invention.

While the embodiment of FIG. 5 conserves chip area by multiplexing sense node outputs, it does not reduce the number of sense nodes required to read out charge from VCCDs 340 (and thus does not increase the sense node pitch). FIG. 6 illustrates an exemplary embodiment of the invention that multiplexes charges from VCCDs 340, with or without combining them, prior to the charges reaching the sense node 350. Thus, as shown, multiple VCCDs 340 (four as shown, but other embodiments feature two, three, or more than four) are associated with a single sense node 350. Specifically, FIG. 6 depicts two cascading delay stages, each of which performs 2:1 multiplexing; thus, in the aggregate, the embodiment of FIG. 6 is a 4:1 multiplexer. Clock groups 600-1, 600-2, 600-3, 600-4 may all be separately controlled and may be independent of the clocks controlling charge flow through the VCCDs 340. Each clock group 600 (which typically includes or consists essentially of two or more clocks) controls charge flow through one or more delay registers 610, each of which typically has multiple phases (the number of which may also correspond to the number of phases in each shift register of VCCDs 340 and/or the number of clocks in one or more clock groups 600). As shown in FIG. 6, at each delay stage, delay registers are added to delay, at that stage, charge flowing through to the next stage, thereby enabling serialization of the charge readout from VCCDs 340 in much the same manner as that described with respect to FIG. 5. Moreover, since each clock group 600 may be operated separately from the others, the embodiment of FIG. 6 enables the combination of charge from two or more VCCDs 340 together for readout at sense node 350 (and subsequent readout circuitry not shown in FIG. 6). For example, clock group 600-4 may not be clocked during operation of clock group 600-3, thus combining the "non-delayed" and "delayed" charges in the stage clocked by clock group 600-3 into the stage clocked by clock group 600-4. Embodiments of the invention combine the embodiments of FIGS. 5 and 6 into a single CCD image sensor 300. Furthermore, the configuration of FIG. 6 may also be utilized to sum the same (or related) colors when the CCD image sensor 300 incorporates a color filter array, as described in more detail below with reference to FIG. 7.

Figure 7:
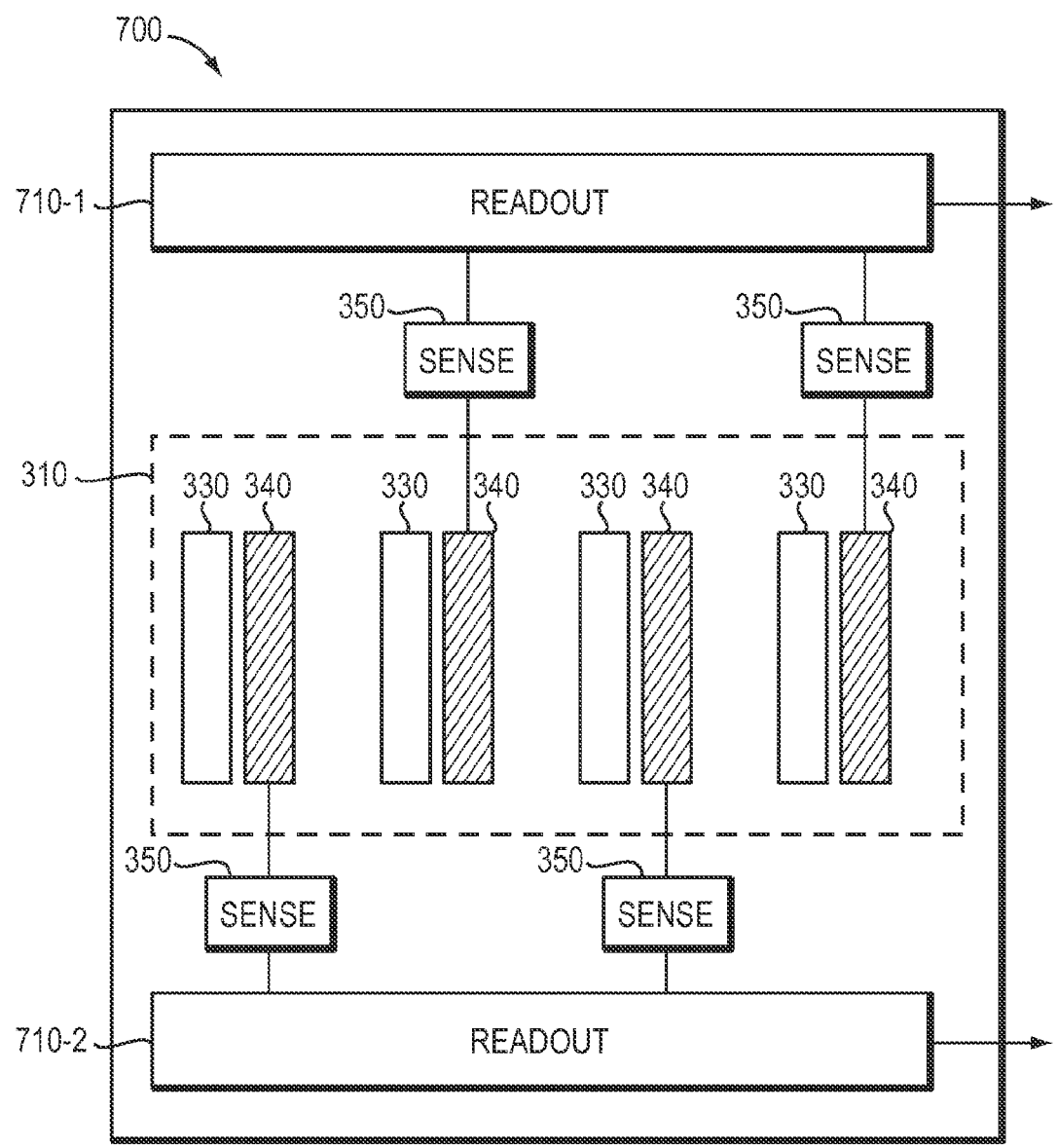
FIG. 7 is a block diagram of a monolithic CCD image sensor with bidirectional readout in accordance with various embodiments of the invention.

Various embodiments of the present invention increase the chip area available for sense nodes 350 and/or associated readout circuits by utilizing multidirectional readout schemes. As depicted in FIG. 7, for example, a CCD image sensor 700 includes one readout circuit 710-1 (that may correspond to, e.g., one or more circuits 400) for readout out the even columns of the array region 310 and another readout circuit 710-2 for readout of the odd columns of the array region 310. While the approach of FIG. 7 involves consumption of chip area by readout circuits on multiple sides of the array region 310, it provides additional chip area on each side for the required sense nodes 350 and associated readout circuitry. Furthermore, the scheme depicted in FIG. 7 facilitates charge binning of various pixel columns 330 for increased sensitivity (albeit at reduced resolution). For example, color filters of various colors may overlie each of the pixels in columns 300, e.g., in the well-known Bayer color filter array (CFA) pattern. In such a case, the bidirectional readout scheme of FIG. 7 reads out charges from green pixels on one side of the array region 310 while charges from red and blue pixels are read on the other side. Thus, similarly colored pixel charge may be summed in the charge domain, rather than resulting voltages from respective columns being averaged, thereby decreasing noise. The embodiment of FIG. 7 may be combined with the embodiment of FIG. 5 and/or the embodiment of FIG. 6, as desired.

Figure 8:
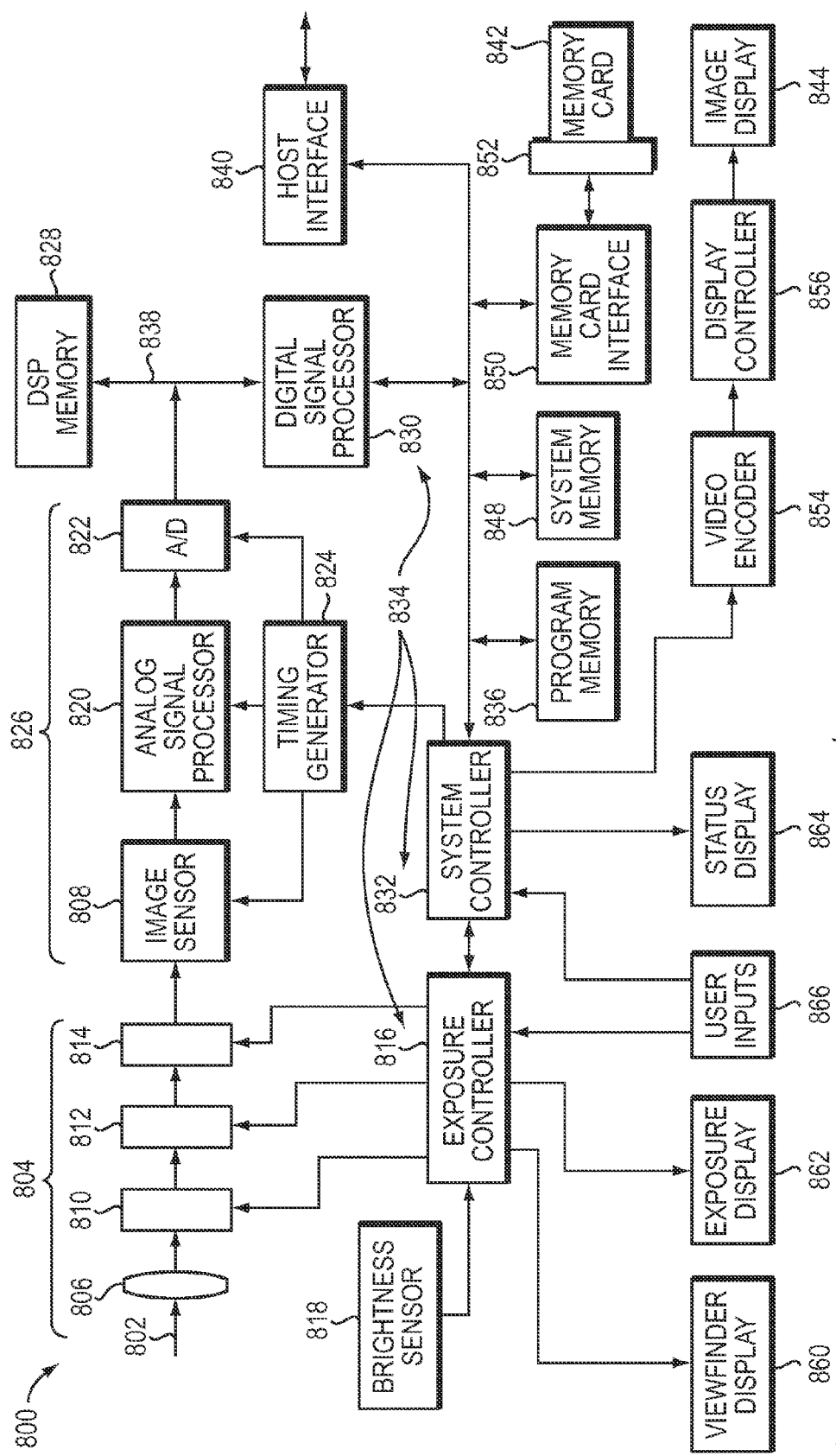
FIG. 8 is a block diagram of an image capture device incorporating a monolithic CCD image sensor in accordance with various embodiments of the invention.

Embodiments of the present invention may be utilized in a variety of different systems and devices, including, for example, digital cameras, digital video cameras, scanners, and telescopes. FIG. 8 illustrates an exemplary image capture device 800 in accordance with an embodiment of the invention. Image capture device 800 is implemented as a digital camera in FIG. 8.

Light 802 from a subject scene to be imaged is input to an imaging stage 804, where the light is focused by a lens 806 to form an image on a CCD image sensor 808 (which may include or consist essentially of, e.g., imaging region 310 of FIG. 3). Image sensor 808 converts the incident light to an electrical signal for each pixel thereof. As mentioned previously, the pixels of image sensor 808 may have a color filter array (not shown) applied thereover so that each pixel senses a portion of the imaging spectrum.

The light passes through the lens 806 and a filter 810 prior to being sensed by image sensor 808. Optionally, light 802 passes through a controllable iris 812 and a mechanical shutter 814. The filter 810 may include or consist essentially of an optional neutral-density filter for imaging brightly lit scenes. An exposure controller 816 responds to the amount of light available in the scene, as metered by a brightness sensor block 818, and regulates the operation of filter 810, iris 812, shutter 814, and the integration time (or exposure time) of image sensor 808 to control the brightness of the image as sensed by image sensor 808.

This description of a particular camera configuration will be familiar to those skilled in the art, and it will be obvious that many variations and additional features are, or may be, present. For example, an autofocus system may be added, or the lenses may be detachable and interchangeable. It will be understood that embodiments of the present invention may be applied to any type of digital camera, where similar functionality is provided by alternative components. For example, the digital camera may be a relatively simple point-and-shoot digital camera, where shutter 814 is a relatively simple movable blade shutter, or the like, instead of a more complicated focal plane arrangement as may be found in a digital single-lens reflex camera. Embodiments of the invention may also be incorporated within imaging components included in simple camera devices such as those found in, e.g., mobile phones and automotive vehicles, which may be operated without controllable irises 812 and/or mechanical shutters 814. Lens 806 may be a fixed focal-length lens or a zoom lens.

As shown, the analog signal from image sensor 808 (corresponding to the amount of charge collected from one or more pixels) is processed by analog signal processor 820 and applied to one or more analog-to-digital (A/D) converters 822. A timing generator 824 produces various clocking signals to select rows, columns, or pixels in image sensor 808, to transfer charge out of image sensor 808, and to synchronize the operations of analog signal processor 820 and A/D converter 822. An image sensor stage 826 (all or parts of which may correspond to CCD image sensor 300 as depicted in FIG. 3) may include image sensor 808, analog signal processor 820, analog-to-digital (A/D) converter 822, and timing generator 824. The resulting stream of digital pixel values from A/D converter 822 is stored in a memory 828 associated with a digital signal processor (DSP) 830.

DSP 830 is one of three processors or controllers in the illustrated embodiment, which also includes a system controller 832 and exposure controller 816. Although this partitioning of camera functional control among multiple controllers and processors is typical, these controllers or processors are combined in various ways without affecting the functional operation of the camera and the application of embodiments of the present invention. These controllers or processors may include or consist essentially of one or more DSP devices, microcontrollers, programmable logic devices, or other digital logic circuits. Although a combination of such controllers or processors has been described, it should be apparent that one controller or processor may be designated to perform all of the required functions. All of these variations may perform the same function and fall within the scope of various embodiments of the invention, and the term "processing stage" is utilized herein to encompass all of this functionality within one phrase, for example, as in processing stage 834 in FIG. 8.

In the illustrated embodiment, DSP 830 manipulates the digital image data in memory 828 according to a software program stored in a program memory 836 and copied to memory 828 for execution during image capture. DSP 830 executes the software necessary for image processing in an embodiment of the invention. Memory 828 may include or consist essentially of any type of random access memory, such as SDRAM. A bus 838, a pathway for address and data signals, connects DSP 830 to its related memory 828, A/D converter 822, and other related devices.

System controller 832 controls the overall operation of the image capture device 800 based on a software program stored in program memory 836, which may include or consist essentially of, e.g., flash EEPROM or other nonvolatile memory. This memory may also be used to store image sensor calibration data, user setting selections, and/or other data to be preserved when the image capture device 800 is powered down. System controller 832 controls the sequence of image capture by directing exposure controller 816 to operate lens 806, filter 810, iris 812, and shutter 814 as previously described, directing timing generator 824 to operate image sensor 808 and associated elements, and directing DSP 830 to process the captured image data. After an image is captured and processed, the final image file stored in memory 828 may be transferred to a host computer via an interface 840, stored on a removable memory card 842 or other storage device, and/or displayed for the user on an image display 844.

A bus 846 includes a pathway for address, data and control signals, and connects system controller 832 to DSP 830, program memory 836, a system memory 848, host interface 840, memory card interface 850, and/or other related devices. Host interface 840 provides a high-speed connection to a personal computer or other host computer for transfer of image data for display, storage, manipulation, and/or printing. This interface may include or consist essentially of an IEEE 1394 or USB 2.0 serial interface or any other suitable digital interface. Memory card 842 is typically a Compact Flash card inserted into a socket 852 and connected to system controller 832 via memory card interface 850. Other types of storage that may be utilized include, without limitation, PC-Cards, MultiMedia Cards, and/or Secure Digital cards.

Processed images may be copied to a display buffer in system memory 848 and continuously read out via a video encoder 854 to produce a video signal. This signal may be output directly from image capture device 800 for display on an external monitor, or processed by a display controller 856 and presented on image display 844. This display is typically an active-matrix color liquid crystal display, although other types of displays may be utilized.

A user interface 858, including all or any combination of a viewfinder display 860, an exposure display 862, a status display 864, image display 844, and user inputs 866, may be controlled by one or more software programs executed on exposure controller 816 and system controller 832. User inputs 866 typically include some combination of buttons, rocker switches, joysticks, rotary dials, and/or touch screens. Exposure controller 816 operates light metering, exposure mode, autofocus and other exposure functions. System controller 832 manages the graphical user interface (GUI) presented on one or more of the displays, e.g., on image display 844. The GUI typically includes menus for making various option selections and review modes for examining captured images.

Exposure controller 816 may accept user inputs selecting exposure mode, lens aperture, exposure time (shutter speed), and exposure index or ISO speed rating and directs the lens and shutter accordingly for subsequent captures. Optional brightness sensor 818 may be employed to measure the brightness of the scene and provide an exposure meter function for the user to refer to when manually setting the ISO speed rating, aperture, and shutter speed. In this case, as the user changes one or more settings, the light meter indicator presented on viewfinder display 860 tells the user to what degree the image will be over- or under-exposed. In an alternate case, brightness information is obtained from images captured in a preview stream for display on image display 844. In an automatic exposure mode, the user changes one setting and exposure controller 816 automatically alters another setting to maintain correct exposure, e.g., for a given ISO speed rating when the user reduces the lens aperture, exposure controller 816 automatically increases the exposure time to maintain the same overall exposure.

The foregoing description of an image capture device will be familiar to one skilled in the art. It will be obvious that there are many variations that are possible and may be selected to reduce the cost, add features, or improve the performance thereof.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An image sensor comprising:
   an array of photosensitive pixels arranged in columns;
   a plurality of vertical CCDs each associated with one of the columns of pixels;
   a plurality of sense nodes each associated with and accepting charge from the vertical CCDs and converting the charge into a voltage; and
   one or more delay stages for outputting charges from two or more vertical CCDs into one of the sense nodes, the one or more delay stages being configured to combine charges from the two or more vertical CCDs prior to output to the one of the sense nodes;
   readout circuitry for accepting voltage from the plurality of sense nodes and, based thereon, outputting signals for reconstruction into an image sensed by the array of photosensitive pixels.

2. The image sensor of claim 1, wherein the readout circuitry comprises a discrete column readout circuit associated with each sense node.

3. The image sensor of claim 2, wherein each column readout circuit comprises circuitry for subtracting a reference value from the sense nodes from a signal value from the sense nodes.

4. The image sensor of claim 1, wherein the array of photosensitive pixels, the plurality of vertical CCDs, the plurality of sense nodes, and the readout circuitry are all portions of a single monolithic integrated circuit.

5. The image sensor of claim 1, wherein the readout circuitry comprises a readout circuit shared by two or more vertical CCDs and the delay stages include delay registers disposed between the two or more vertical CCDs and the sense node associated therewith.

6. The image sensor of claim 1, wherein the readout circuitry comprises (i) a first portion disposed on a first side of the array of photosensitive pixels and (ii) a second portion disposed on a second side of the array of photosensitive pixels different from the first side.

7. The image sensor of claim 6, wherein the first side and the second side are opposite sides.

8. The image sensor of claim 6, wherein some of the plurality of sense nodes are disposed on the first side and some others of the plurality of sense nodes are disposed on the second side.

9. The image sensor of claim 1, wherein each sense node comprises a floating diffusion, a reset transistor, and an amplifier.

10. The image sensor of claim 1, wherein the image sensor has an interline architecture in which each vertical CCD is proximate the column of pixels associated therewith.

11. The image sensor of claim 1, wherein the image sensor has a full-frame architecture in which each vertical CCD is the column of pixels associated therewith.

12. The image sensor of claim 1, wherein the one or more delay stages is configured to combine charges from alternating vertical CCDs.

13. A method of operating an image sensor comprising an array of photosensitive pixels arranged in columns, a vertical CCD associated with each column of pixels, a plurality of sense nodes each associated with two or more of the vertical CCDs, and one or more delay stages between the each vertical CCDs and the sense node, the method comprising:
   outputting charge from each vertical CCD into the one or more delay stages associated therewith;
   combining charge from a plurality of vertical CCDs in the one or more delay stages; and
   converting the combined charge from delay stages into voltage with the associated sense node to form a plurality of different sense voltages;

reading out the plurality of sense voltages for reconstruction into an image sensed by the array of photosensitive pixels.

14. The method of claim 13, wherein the charge conversion and reading out are performed for a first portion of the photosensitive pixels on a first side of the array and for a second portion of the photosensitive pixels on a second side of the array different from the first side.

15. The method of claim 13, wherein combining charge from a plurality of vertical CCDs includes combining charges from alternating CCDs.

* * * * *